United States Patent

[11] 3,552,414

[72] Inventor Trevor G. Sutton
 Tempe, Ariz.
[21] Appl. No. 700,128
[22] Filed Jan. 24, 1968
[45] Patented Jan. 5, 1971
[73] Assignee The Garrett Corporation
 Los Angeles, Calif.
 a corporation of California

[54] PULSATING FLUID PRESSURE FREQUENCY RECTIFIER
 9 Claims, 4 Drawing Figs.
[52] U.S. Cl. ................................................. 137/81.5
[51] Int. Cl. ................................................. F15c 1/14
[50] Field of Search .................................... 137/81.5

[56] References Cited
UNITED STATES PATENTS

| | | | |
|---|---|---|---|
| 3,379,204 | 4/1968 | Kelley et al. | 137/81.5 |
| 3,411,520 | 11/1968 | Bowles | 137/81.5 |
| 3,459,206 | 8/1969 | Dexter | 137/81.5 |
| 3,461,898 | 8/1969 | Bellman et al. | 137/81.5 |
| 3,467,125 | 9/1969 | Dexter | 137/81.5 |
| 3,159,168 | 12/1964 | Reader | 137/81.5 |
| 3,185,166 | 5/1965 | Horton et al. | 137/81.5 |
| 3,191,860 | 6/1965 | Wadey | 137/81.5X |
| 3,228,410 | 1/1966 | Warren et al. | 137/81.5 |
| 3,266,510 | 8/1966 | Wadey | 137/81.5 |
| 3,398,758 | 8/1968 | Unfried | 137/81.5 |
| 3,412,745 | 11/1968 | Kelley | 137/81.5 |
| 3,434,487 | 3/1969 | Bauer | 137/81.5 |

Primary Examiner—Samuel Scott
Attorneys—Herschel C. Omohundro and Vincent Harsha ABSTRACT: The pulsating fluid pressure frequency rectifier shown herein comprises a proportional amplifier having a power stream-forming nozzle, a plurality of output ports, control nozzles for applying control streams to the sides of the power stream to deflect fluid under pressure to the output ports, and fluid pressure conductors for receiving pulsating fluid streams from a suitable oscillator. The conductors are arranged to split such streams into a plurality of branch streams, shift the frequency phase and amplitude of the pulsating branch streams relative to one another to produce, in effect, a DC stream of requisite amplitude, and direct the resulting rectified stream against the power stream to produce a fluid pressure signal of required strength and uniformity.

INVENTOR.
TREVOR G. SUTTON
BY
Herschel C. Omohundro
ATTORNEY

INVENTOR.
TREVOR G. SUTTON 3,552,414

PULSATING FLUID PRESSURE FREQUENCY RECTIFIER

SUMMARY

This invention relates to the fluidics art and is particularly directed to the combination of a fluid pressure oscillator, one or more amplifiers, and fluid conducting passages constructed and arranged to rectify pulsating fluid pressure streams and produce a substantially steady signal suitable for use in controlling the operation of any desired mechanism, such as that employed in aircraft air conditioning equipment.

The control field has recently been introduced to the use of fluidic (relatively stationary devices with fluids only moving) for performing a multitude of tasks heretofore believed possible only by mechanical or electrical components. The new art employs fluid flowing under pressure and, in many instances, the pressure is caused to pulsate at rates or frequencies having some relation to a variable parameter, such as the speed of a rotating element, temperature, pressure, etc. It has been discovered that the use of pulsating pressure signals may be facilitated through rectification of the pulse frequencies and amplitude modulation to produce signals with steady pressures of desired amplitudes.

An object of this invention, therefore, is to provide a mechanism which will supply a fluid amplifier with control signals of such character that the output signals from the amplifier will be smooth and of the required strength.

Another object is to provide a combination of fluidic components which may be connected in a fluid control system and will function to produce a plurality of pulsating signal streams and adjust the phases of the frequencies of such pulsations so that when the streams are applied to a power stream, either separately or combined, a substantially ripple-free output stream will result.

Still another object is to so construct certain of the components in the combination mentioned in the preceding paragraph that the phases of the pulsations will be shifted and the resonating characteristics of the components will be utilized to produce steady signals of amplified or attenuated force.

A more specific object of the invention is to provide a combination fluid amplification and frequency rectification means having a proportional summing amplifier with control nozzle means and conducting means for receiving a pulsating stream or streams, dividing such stream or streams into a plurality of branch streams of different lengths so selected that the frequency phase of the pulsations of each branch stream will be shifted relative to those of other branch streams, and delivering such branch streams to the control nozzle means in such a manner that the effect will be a resultant stream composed essentially of the maximum pressure surges of the pulsating stream so as to be substantially devoid of pulsation and of requisite force.

A further object is to provide a combination fluid amplification and frequency rectification means having an amplifier with control nozzle means and a plurality of passages of predetermined different lengths leading from a frequency producing device or sensor, the passages having certain selected characteristics as to cause the delivery to the control nozzle means of a signal stream having desired qualities which will be pointed out hereinafter.

Other objects and advantages of the invention will be apparent from the following description of one form of the invention illustrated in detail in the accompanying drawings.

THE DRAWINGS

DESCRIPTION

Figure 1:
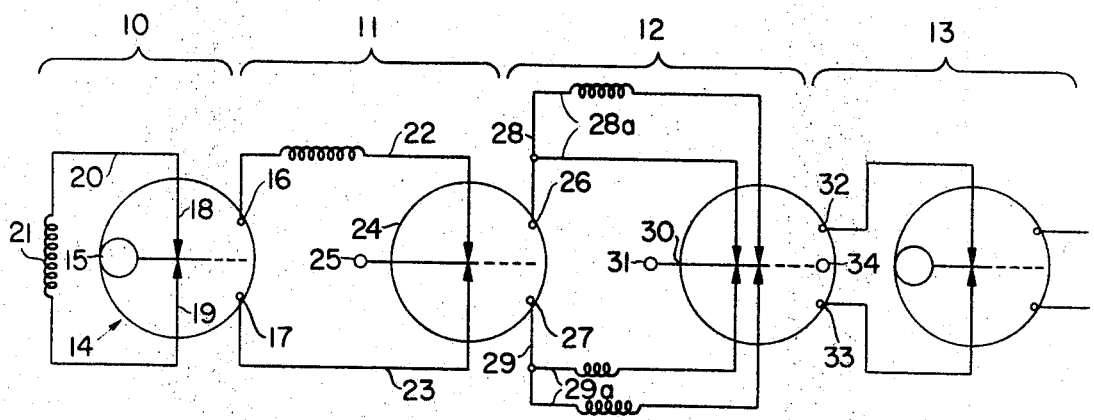
FIG. 1 is a schematic view of a portion of a fluid system incorporating a combination fluid amplifier and rectifier formed in accordance with the present invention, the system being designed to detect temperature variations in a predetermined region.

Referring more particularly to FIG. 1 of the drawing, it will be observed that the fluid pressure system schematically illustrated therein includes the following components: a frequency generator 10, a discrimination circuit 11, a rectifier 12, and one or more stages of amplification 13.

The frequency generator 10 comprises an oscillator 14 having a source of fluid pressure 15 connected therewith. The oscillator is a type of fluid amplifier in which the fluid from source 15 is directed in a power stream generally toward a pair of output ports 16 and 17 and is alternately deflected to one or the other of said ports by control fluid jets 18, 19 communicating with the ends of a sense line 20 which has a portion 21 exposed and affected by temperature in the region under supervision by the system. In the operation of oscillator 14, fluid signals in sense line 20 pass at the local speed of sound, first in one direction, then in the other, to apply control forces to the power stream. Since the local speed of sound is determined, in part, by the temperature, the movement of these control forces varies in response to temperature changes applied to the portion 21 of the sense line 20. As a result, streams flow alternately from the output ports 16 and 17 at frequencies dependent upon the temperature in the predetermined region.

Such streams are further modified by passing them through conductors 22 and 23 of the discrimination circuit 11. This component is also a form of fluid amplifier having an inlet 24 communicating with a source of fluid pressure 25. Conductors 22 and 23 have predetermined resonance characteristics, or they may be turned to the selected degree, which causes the pulsating streams to resonate in a manner to modulate the amplitude of the pulsations. The signal thus results in a differential amplitude variable frequency proportional to the frequency which is in turn a function of the temperature.

Fluid pressure from source 25 produces a power stream which is deflected by the pulsating signals from conductors 22 and 23 into output ports 26 and 27 from which signal streams with frequencies, wave forms, and amplitude determined by the control signals from the discriminator flow through conductors 28 and 29 forming part of the rectifier 12 which constitutes the present invention. This component is also a form of fluid amplifier designated herein as a proportional summing amplifier. It, too, has a power stream-forming inlet 30 communicating with a source 31 of fluid pressure. The power stream is directed generally toward a pair of output ports 32 and 33. In the absence of other conditions, the power stream normally is either vented to the ambient atmosphere through vent port 34 or collected equally by the ports 32 and 33.

Figure 2:
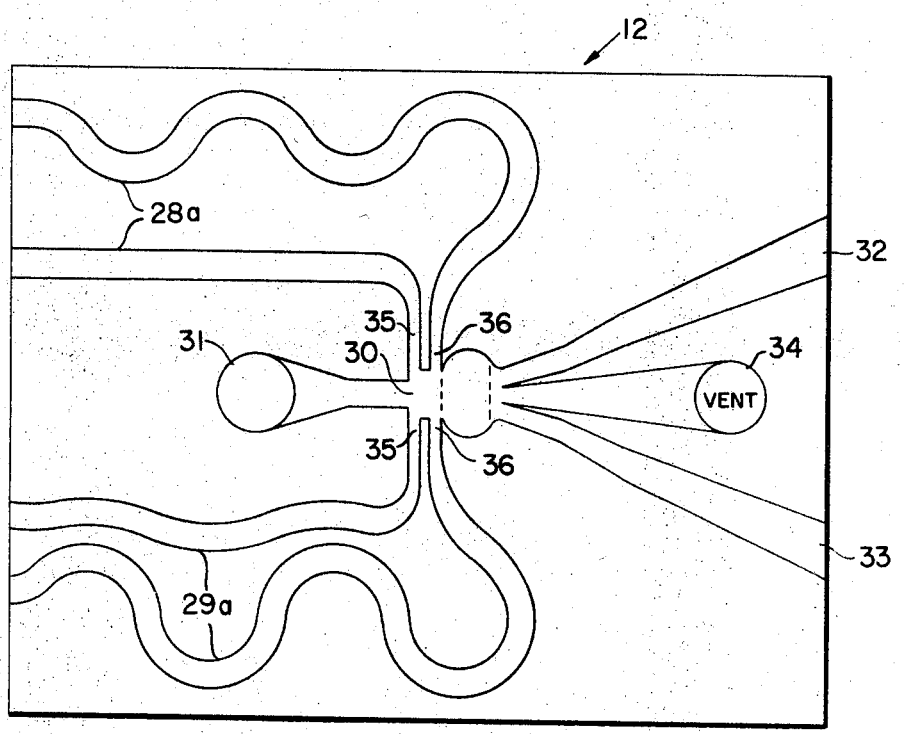
FIG. 2 is a schematic view of one form of the combined fluid amplifier and rectifier on an enlarged scale to show the invention in greater detail.
Figure 3:
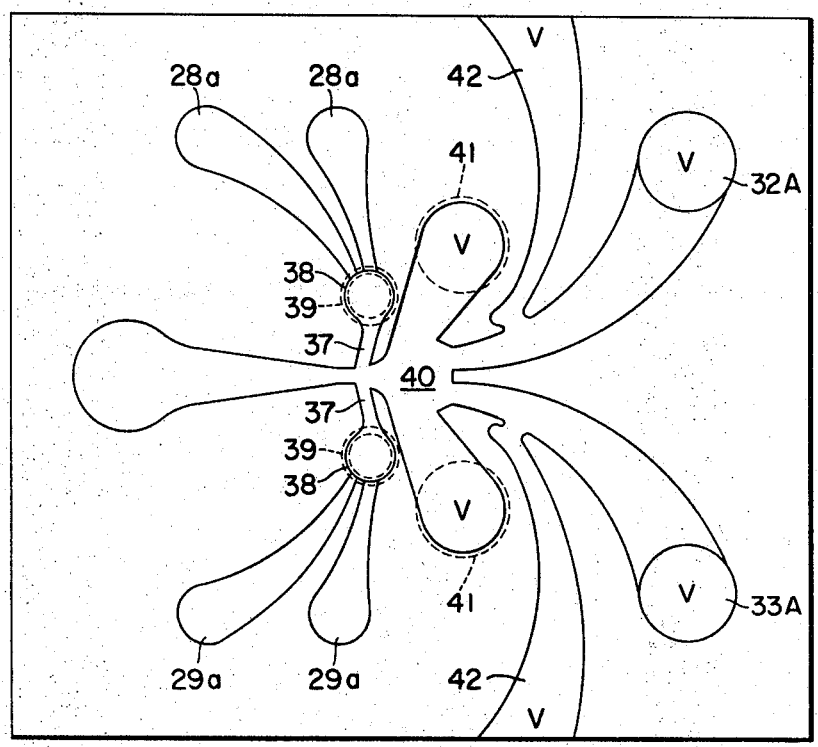
FIG. 3 is a similar view of another form of this invention.

The rectifier in the form shown in FIG. 2 has a plurality of control stream nozzle 35 and 36 at each side of the inlet or nozzle 30 for the power stream. In another form, shown in FIG. 3, a single control stream nozzle 37 is provided at each side of the power stream nozzle. In both forms, however, the conduits 28 and 29 leading to the control stream nozzles are divided into a plurality of branches 28a and 29a, respectively. Two such branches are shown in FIGS. 2 and 3 for each conduit, but it should be obvious that as many branches as found desirable or necessary may be provided. In a form, as in FIG. 2, where a plurality of control stream nozzles are provided, one branch will communicate with each nozzle. In the other form, as in FIG. 3, all branches on the corresponding side of the rectifier will connect with the control stream nozzle on such side.

Figure 4:
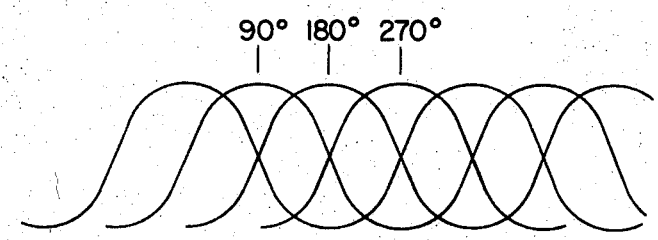
FIG. 4 is a time-versus-amplitude chart illustrating the function of the invention.

From FIG. 2 it will be observed that the branch conduits are all of different lengths. This construction is employed to shift the phase of the pulsations and cause an overlapping of the pulsations, as shown on the chart of FIG. 4. In this FIG., the effect of four branch conduits is indicated, these branches being selected to cause the pulsation frequency phase to be shifted in increments of 90°, and the differential control signal resulting will be substantially equal in amplitude to the RMS value of the differential pulsating output of the discriminator. A smoother, more uniform signal will result from more branches selected to shift the frequency phase in smaller increments. In the form of summing amplifier, shown in FIG. 3, the control stream nozzles 37 communicate with the control stream branches via chambers 38 which are vented to the ambient atmosphere, as at 39, to permit true summing of the control signals. The fluid stream interaction chamber 40 is also vented at 41 and the output passages 32a and 33a are vented, as at 42, for the relief of static pressures. The control streams thus applied to the power stream will be the approximate sum of the streams from the conduit branches connected with the particular nozzle or nozzles. By reason of the phase shift and the amplitude modulation, the control signal is relatively smooth. This control signal is applied to the power stream in the rectifier to deflect it and produce at the output ports a relatively steady signal which can be amplified as many times as necessary in stage 13 or duplicates thereof to secure the desired result.

It will be apparent that the embodiments of the invention shown are merely exemplary and that various modifications may be made in construction and arrangement within the scope of the invention as defined in the following claims.

I claim:

1. Combination fluid amplification and frequency rectification means comprising:
   a. a first means for causing a fluid pressure stream to pulsate at a predetermined frequency;
   b. a second means dividing said pulsating fluid pressure stream into a plurality of branch streams, said second means modifying the frequency phase of such branch streams and summing the branch streams to produce a signal force bearing a relation to said predetermined frequency; and
   c. means producing a fluid pressure beam to one side of which said signal force is applied to provide an amplified signal stream with a relatively steady fluid pressure related to said predetermined frequency.

2. The combination fluid amplification and frequency rectification means of claim 1 in which said second means has structure for combining the branch streams and applying the resultant stream to one side of said power stream to produce said signal stream.

3. The combination fluid amplification and frequency rectification means of claim 1 in which the first means causes dual fluid pressure streams to pulsate at predetermined frequencies, and said second means has structure for modifying the pulsation frequency phase of at least one of said fluid pressure streams and applying such dual streams to opposed sides of a power stream to produce a pair of fluid pressure streams with contrasting frequency phases, and means for dividing each stream of such pair into a plurality of branch streams with phase shifting characteristics, and simultaneously applying certain branch streams to one side of a power stream and the rest of the branch streams to the other side of said power stream to produce a signal stream with relatively steady pressure.

4. The combination fluid amplification and frequency rectification means of claim 1 in which the lengths of the branch passages of the second means are selected to shift the pulsation frequency phase of each branch stream a predetermined number of degrees.

5. The combination fluid amplification and frequency rectification means of claim 4 in which the lengths of the passages of the second means are selected to shift the pulsation frequency phases in increments of 90°.

6. Combination fluid amplification and frequency rectification means, comprising:
   a. a first means for causing a fluid pressure stream to pulsate, said means having a sensing portion responsive to variations in temperature to change the frequency of the pulsations;
   b. a second means responsive to said pulsating fluid pressure stream to produce a second pulsating fluid pressure stream, said second means having structure to modify the frequency phase and amplitude of said second pulsating fluid pressure stream; and
   c. a third means for receiving and rectifying the second pulsating fluid pressure stream and utilizing the same to produce a relatively steady signal stream with a pressure characteristic related to the temperature dependent frequency, said third means having structure to divide the second pulsating fluid pressure stream into a plurality of branch streams and change the pulsation phases of the branch streams relative to one another to cause an overlapping of pulsations, a nozzle for directing a power stream toward a pair of output ports, and control jet nozzle means at each side of said power stream nozzle, said control jet nozzle means applying combined branch streams to the power stream to produce a substantially steady fluid signal at a pressure bearing a direct relation to temperature sensed by the sensing portion of said first means.

7. The combination fluid amplification and frequency rectification means of claim 6 in which the stream-dividing and pulsation phase-changing structure has a plurality of passages of different lengths with contrasting resonance characteristics.

8. A proportional summing amplifier, comprising:
   a. means forming a body with a fluid stream interaction chamber, a plurality of output ports leading from such chamber, and a nozzle for directing a power stream into said interaction chamber generally toward said output ports;
   b. control streams branch passages of contrasting lengths formed in said body to receive a pulsating signal stream from a single source, divide the same into branch streams and change the frequency phases of the branch streams; and
   c. control jet directing means at the sides of said nozzle upstream of said interaction chamber to apply predetermined control signal branch streams with changed frequency phases to the same side of said power stream to deflect the same toward an output port determined by the strength of the combined predetermined control jet branches.

9. The proportional summing amplifier of claim 8 in which a plurality of branch passages communicate with the same control jet directing means to produce a control stream substantially equal to the sum of the streams from the branch passages.